March 19, 1963

B. E. HOOPER

TRANSMITTER SYSTEM INCLUDING AMPLITUDE CONTROLLED OSCILLATOR MEANS

Filed Oct. 10, 1958

3,082,382

INVENTOR:
Brian E. Hooper
By Smyth & Roston
Attorneys

United States Patent Office 3,082,382

Patented Mar. 19, 1963

3,082,382

TRANSMITTER SYSTEM INCLUDING AMPLITUDE CONTROLLED OSCILLATOR MEANS

Brian E. Hooper, Sherman Oaks, Calif., assignor to Packard-Bell Electronics Corporation, Los Angeles, Calif., a corporation of California Filed Oct. 10, 1958, Ser. No. 766,438

11 Claims. (Cl. 331—47)

Figures 1, 2:
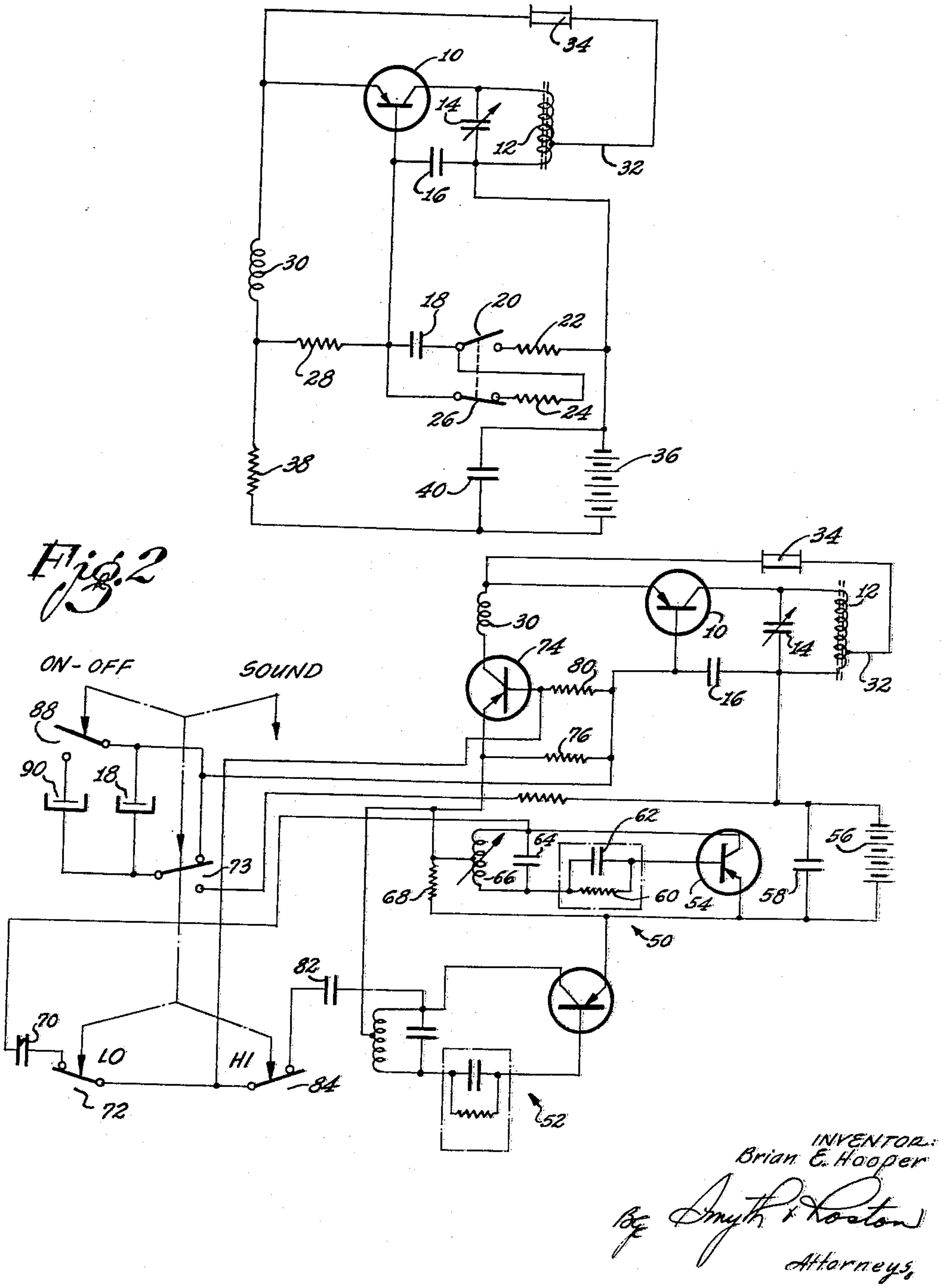

This invention relates to oscillators and more particularly to oscillators for producing signals for controlled periods of time. The invention especially relates to oscillators employing semiconductors such as transistors to provide oscillatory signals having a substantially constant amplitude for the controlled period of time.

In many applications, it is desired to produce oscillatory signals at a particular frequency for a selected period of time. It is often further described that the signals have a substantially constant amplitude during this period so that the response of the stages receiving the signals can be uniform during the controlled period of time in which the signals are produced. For example, signals having a constant amplitude for a selected period of time may be required to provide certain controls such as in the opening of a door or in the operation of a machine tool. If the signals have a duration different from the selected period or have a variable amplitude during this period, the machine tool may cut a workpiece in a different configuration than that desired.

Until now, several stages have generally had to be used to obtain the production of oscillatory signals at a constant amplitude for a controlled period of time. For example, the oscillatory signals have been produced by one stage and have been introduced to subsequent stages which gate the passage of the oscillatory signals so that the signals can be passed only for a particular period of time. As will be seen, such electronic circuitry is fairly complex. Any circuits developed to produce oscillatory signals for a controlled period of time in a single stage have had the disadvantage that the oscillatory signals do not retain a constant amplitude throughout the period. By way of illustration, the amplitude of the oscillatory signals may tend to decay as the particular period progresses.

This invention provides an oscillator which requires only a single stage to produce oscillatory signals having a constant amplitude and having a controlled duration. The invention is further advantageous in that it uses a semiconductor such as a transistor to serve as the element for controlling the flow of current at any instant. In addition to the semiconductor, the oscillator includes a tuned circuit which is resonant at the desired frequency. The oscillator further includes a feedback path from the output electrode of the semiconductor to the control electrode of the semiconductor. This feedback path serves to introduce output energy back into the semiconducor in an inverse phase relationship relative to the output energy so as to obtain an oscillatory flow of current through the semiconductor.

Energy storage means such as a capacitance is connected between the input and output electrodes of the semiconductor to receive a charge in accordance with the flow of current through the semiconductor. When the voltage produced across the capacitance by the charge in the capacitance reaches a particular value, the semiconductor becomes biased against any further flow of current. In this way, the period of time for the flow of oscillatory current through the capacitance is dependent upon the value of the capacitance. Furthermore, the capacitance does not provide any interference with the full operation of the oscillator until the production of the particular voltage across the capacitance. This causes the oscillatory signals to have a substantially constant amplitude during the peroid of time that the signals are produced.

In the drawings:

FIGURE 1 is a circuit diagram of an oscillator constituting one embodiment of the invention; and FIGURE 2 is a circuit diagram of a transmitting system in which the oscillator shown in FIGURE 1 may be included.

In the oscillator shown in FIGURE 1, a semiconductor such as a transistor 10 is provided with a control electrode such as an emitter, an input electrode such as a base and an output electrode such as a collector. The transistor 10 is preferably a PNP type such as a Type 2N371. A tuned circuit formed by an inductance 12 and a capacitance 14 is connected to the collector of the transistor 10. The inductance 12 and the capacitance 14 are preferably in parallel and the capacitance may be adjustable so that the tuned circuit formed by the inductance and the capacitance may be resonant at a desired frequency. For example, the inductance 12 and the capacitance 14 may be resonant at a suitable frequency such as 27 megacycles.

A capacitance 16 is connected at one end to the tuned circuit formed by the inductance 12 and the capacitance 14 and is connected at the other end to the base of the transistor 10. The capacitance 16 may be provided with a value in the order of 0.001 microfarad. A capacitance 18, a switch 20 and a resistance 22 are in series across the capacitance 16. The switch 20 may be normally open and may be closed when it is desired to obtain oscillatory signals from the circuit shown in FIGURE 1. The resistance 22 may be provided with a value in the order of 68 kilo-ohms and the capacitance 18 may be provided with a value dependent upon the period of time desired for the production of oscillatory signals. For example, the capacitance 18 may be provided with a value in the order of 4 microfarads when it is desired to produce signals for a relatively short period of time such as one second. Similarly, the capacitance 18 may be provided with a value in the order of 25 microfarads for the production of signals for a duration in the order of 4 seconds.

A resistance 24 and a switch 26 are in series across the capacitance 18. The resistance 24 may be provided with a suitable value in the order of 1 kilo-ohm to dissipate energy for the discharge of the capacitance 18. The switch 26 may be ganged to the switch 20 so as to become opened upon a closure of the switch 20 and so as to become closed upon an opening of the switch 20. A resistance 28 and a choke coil 30 may be in series between the base and the emitter of the transistor 10. The resistance 28 may have a value in the order of 39 kilo-ohms, and the choke coil 30 may have parameters to prevent the passage of oscillatory signals at the output frequency such as 27 megacycles. A feedback path indicated by a lead 32 is provided between the emitter of the transistor 10 and an intermediate tap in the inductance 12. A crystal 34 may be disposed in this feedback path to insure that feedback energy is provided and to insure that oscillatory signals at precisely the required frequency are produced.

The negative terminal of a source of direct voltage such as a battery 36 is connected at one end to the terminal common to the inductance 12 and the capacitances 14 and 16. The battery 36 is provided with characteristics to yield a suitable potential such as approximately 22.5 volts. The positive terminal of the battery 36 is connected to one terminal of a resistance 38 which may have a value in the order of 330 ohms and which has its second terminal connected to the terminal common to the resistance 28 and the choke coil 30. A capacitance 40 having a value in the order of 0.05 microfarad is in parallel with the battery 36.

When the switch 20 is open, no charge is able to be produced in the capacitance 18. Furthermore, any charge existing in the capacitance becomes dissipated by the flow of current through a circuit including the capacitance, the resistance 24 and the switch 26 since the switch 26 is closed at the time that the switch 20 is open. Because of the fact that the capacitance 18 cannot receive a charge, current cannot flow through the transistor 10 to obtain the production of oscillatory signals in the resonant circuit formed by the inductance 12 and the capacitance 14. This will become apparent subsequently.

During the time that the switch 20 is open, the resistance 28 operates to bias the base of the transistor 10 at a potential approaching that on the emitter. This cuts off any flow of current through the transistor 10 and prevents any current from flowing between the emitter and collector of the transistor.

Upon a closure of the switch 20, current starts to flow through the transistor 10 to provide a transfer of energy between the emitter and the collector of the transistor. A portion of this energy is fed back through the crystal 34 to the emitter of the transistor 10. This feedback occurs in an inverse phase relationship to the output from the transistor 10.

By providing an inverse phase relationship between the energy in the tuned circuit and the feedback energy from the crystal 34, the input to the emitter of the transistor 10 operates to produce a decrease in the flow of current through the transistor upon an increase in the output from the transistor. Similarly, an increase in the flow of current through the transistor 10 is obtained upon a decrease in the output from the transistor. As will be seen, the provision of a positive feedback causes oscillatory signals to be produced in the transistor 10.

The frequency of the oscillatory signals produced on the collector of the transistor 10 is dependent in large part upon the resonant frequency of the circuit formed by the inductance 12 and the capacitance 14. The frequency is precisely controlled by the inclusion of the crystal 34 between the resonant circuit and the emitter of the transistor 10.

When the switch 20 is initially closed, no charge exists in the capacitance 18. This causes the base and the collector of the transistor 10 to be effectively at the same potential such that a large current flows through the transistor 10. Since the capacitance 18 effectively looks like a short circuit because of the lack of any charge in the capacitance, current having a large amplitude also flows initially through the capacitance.

As the charge in the capacitance 18 increases, the effective impedance presented by the capacitance on a direct voltage basis tends to decrease. This results from the fact that the flow of current through the capacitance 18 also tends to decrease with increases in the charge in the capacitance. When the impedance presented by the capacitance 18 becomes sufficiently high, an open circuit appears to exist across the capacitance and accordingly between the base and the collector of the transistor 10. This causes the potential on the base of the transistor 10 to approximate the potential on the emitter of the transistor so that the transistor becomes cut off. When the transistor 10 becomes cut off, no further oscillatory signals can be produced by the circuit shown in FIGURE 1. The amount of time required for the capacitance 18 to charge sufficiently for an interruption in the flow of current through the transistor 10 is dependent upon the value of the capacitance 18.

The function of the capacitance 18 is producing a state of nonconductivity in the transistor 10 may also be seen from the following discussion. As the capacitance 18 charges, the voltage drop produced across the capacitance correspondingly increases. Since the potential on the collector of the transistor 10 is substantially fixed because of the coupling of the collector to the negative terminal of the battery 36 through the inductance 12, the potential on the base of the transistor tends to rise as the capacitance 18 becomes charged. The potential on the base of the transistor 10 increases at a rate dependent upon the value of the capacitance 18. Upon the production of a potential on the base approaching the potential on the emitter, the transistor 10 becomes cut off.

It will be seen from the previous discussion that the period of time for the production of oscillatory signals can be accurately controlled by varying or adjusting the value of the capacitance 18. It will be further seen that the oscillatory signals produced during the state of conductivity of the transistor 10 have a substantially constant amplitude. This results from the fact that the capacitance 18 does not appreciably affect the conductivity of the transistor 10 until the cutoff potential is reached. At such a time, the transistor 10 becomes instantaneously converted from a state of conductivity to a state of nonconductivity.

During the time that oscillations are being produced in the oscillator shown in FIGURE 1, it is desirable that the impedance at the oscillatory frequency be maintained substantially constant. Since the impedance provided by the capacitance 18 tends to vary with the charge in the capacitance, the impedance at the oscillatory frequency would also tend to vary. This is prevented by the inclusion of the capacitance 16, which provides a low impedance across the capacitance 18 at the oscillatory frequency.

If the resistance 22 were not included in the oscillator shown in FIGURE 1, the capacitance 18 would, in effect, provide a short circuit at the time that the switch 20 was initially closed. This would prevent any oscillations from being produced until the capacitance became at least partially charged. In this way, a delay in the time for the initiation of oscillations would result and this delay would be partly dependent upon the value of the capacitance 18.

By including the resistance 22, oscillations are initiated immediately upon the closure of the switch 20. The inclusion of the resistance 22 is also advantageous since the RC constant provided by the capacitance 18 and the resistance 22 controls the period of time in which oscillations are produced. By including the resistance 22, the value of the capacitance 18 required to obtain a desired period of oscillations can be correspondingly reduced. This tends to minimize costs since capacitances tend to be more expensive than resistances.

It will be appreciated that the switch 20 has to be maintained in its closed position during the time that the oscillatory signals are desired to be produced. However, the oscillatory signals will be produced only for the desired period of time even when the switch 20 is maintained closed for a period of time longer than the desired period.

As the battery 36 ages, its impedance correspondingly tends to increase. The capacitance 40 is included to provide a low and substantially constant impedance across the battery 36 so that the battery will appear to present a substantially constant impedance with time.

The oscillator shown in FIGURE 1 and described above is included with slight modifications in the embodiment shown in FIGURE 2. In the embodiment shown in FIGURE 2, the oscillator produces signals which serve as a carrier for modulating signals produced by a pair of modulators generally indicated at 50 and 52. For purposes of illustration, the modulators 50 and 52 are shown as oscillators for producing modulating signals at substantially constant frequencies. Since the construction of the oscillators 50 and 52 may be similar, only the oscillator 50 is shown in detail and the oscillator 52 is shown in block form.

The oscillator 50 includes a semiconductor such as a

PNP transistor 54 which may be a type 2N406 or a type 2N363. The emitter of the transistor 54 is coupled to the positive terminal of a source of direct voltage such as a battery 56 and to one terminal of a capacitance 58. The battery 56 and the capacitance 58 may respectively correspond to the battery 36 and the capacitance 40 in the embodiment shown in FIGURE 1. A resistance 60 and a capacitance 62 are connected in parallel between the base of the transistor 54 and the first terminal of a tuned circuit formed by a capacitance 64 and an inductance 66. The inductance 66 and the capacitance 64 have second terminals connected to the collector of the transistor 54.

A resistance 68 extends electrically between an intermediate tap in the coil 66 and the emitter of the transistor 54. The resistances 60 and 68 may respectively have values in the order of 100 kilo-ohms and 330 ohms, and the capacitances 62 and 64 may respectively have values in the order of 470 micromicrofarads and 2700 micromicrofarads when a suitable frequency such as 100 kilocycles per second is to be produced by the oscillator 50.

The signals produced on the collector of the transistor 54 are introduced through a coupling capacitance 70 to the stationary contact of a manually operable single-pole, single-throw switch 72. The switch 72 is ganged to the movable arm of a switch 73 corresponding to the switches 20 and 26 so that the movable arm of the switch 78 engages the lower stationary contact in FIGURE 2 when the switch 72 becomes open. The movable arm of the switch 72 is coupled to the base of a semiconductor such as a PNP transistor 74, which may also be a type 2N363 or a type 2N406. The emitter of the semiconductor 74 has a common connection with the intermediate tap of the coil 66 and the collector of the semiconductor has a common connection with the choke coil 30 (also shown in FIGURE 1). A resistance 76 corresponding to the resistance 28 in FIGURE 1 is disposed electrically between the emitter of the transistor 74 and the base of the transistor 10. A resistance 80 extends electrically between the base of the transistors 74 and 10 and may have a value in the order of 4.7 kilo-ohms.

In like manner, the output signals from the oscillator 52 are introduced through a coupling capacitance 82 to the stationary contact of a manually operable single-pole, single-throw switch 84. The movable arm of the switch 84 is also gauged to the movable arm of the switch 73 so as to control the positioning of the movable arm in the switch 73. The movable arm of the switch 84 is connected to the base of the transistor 74 in a manner similar to the movable arm of the switch 72.

The embodiment shown in FIGURE 2 is similar to the remote transmitting unit which is included in copending application Serial No. 766,436, filed October 10, 1958, by me on Signalling System. This copending application relates to apparatus for providing a remote control over the operation of a television receiver so as to control such functions as turning the set on and off, changing television channels and reducing and restoring the intensity of the sound. In the system described and claimed in the copending application, certain controls are obtained by signals transmitted for a first particular period of time and other controls are provided by signals transmitted for a second particular period of time different from the first particular period of time. Transmission of the signals in the second particular period of time is controlled by the operation of a single-pole, single-throw switch 88 which is ganged to the switch 73 so as to control the operation of the switch 73. A capacitance 90 is connected to be placed in parallel with the capacitance 18 when the switch 88 is closed.

The oscillator, including the transistor 10, the coil 12 and the capacitance 14, operates in a manner similar to that described above with respect to the embodiment shown in FIGURE 1. The choke coil 30 is included to provide a high impedance so as to make certain that substantially all of the feedback energy from the crystal 34 is introduced to the emitter of the transistor 10 to sustain the oscillations and to make certain that relatively little of the energy will be bypassed to the transistor 74. The transistor 74 is biased on its base with a potential corresponding to the bias on the base of the transistor 10. Because of this, the transistor 74 is conductive for the same period of time as the transistor 10 and tends to be cut off during the period of time in which oscillations are not being produced by the transistor 10.

The oscillators 50 and 52 operate in a conventional manner. For example, oscillations are produced in the oscillator 50 by a feedback of energy from the collector of the transistor 54 to the base of the transistor through the coil 66 and through the resistance 60 and the capacitance 62 in parallel. The oscillator 50 produces modulating signals at a first suitable frequency such as 100 kilocycles per second, and the oscillator 52 produces modulating signals at a second particular frequency such as 20 kilocycles per second. When the switch 84 is operated, signals from only the oscillator 50 are introduced through the transistor 74 to the transistor 10 to modulate the oscillatory signals produced in the transistor 10. Similarly, signals from only the oscillator 52 pass through the transistor 74 to modulate the oscillatory signals in the transistor 10 upon a depression of the switch 72.

The switches 72 and 84 are ganged to the switch 73 so as to couple the capacitance 18 into the oscillatory circuit including the transistor 10, the coil 12 and the capacitance 14 when either of the switches 72 or 84 is actuated. This causes the oscillator including the transistor 10 and including the coil 12 and the capacitance 14 in parallel to produce signals for a first particular period of time. Similarly, the capacitance 90 becomes coupled into the oscillator in parallel with the capacitance 18 upon an actuation of the switch 88. This causes the oscillator including the transistor 10, the coil 12 and the capacitance 14 to produce signals for a second period of time longer than the first period. As described in copending application Serial No. 766,436, the signals of short duration may control such operations in a television receiver as a change in the channel being received at any instant, and the signals of relatively long duration may control such operations as turning the television set on or off or adjusting the audio level of sound in the receiver.

The embodiment shown in FIGURE 2 has certain important advantages in addition to those obtained from using the oscillator shown in FIGURE 1. For example, advantages are obtained by including the transistors 10 and 74 in the arrangement shown in FIGURE 2. This arrangement is equivalent to placing two switches in series where both switches are simultaneously closed to initiate oscillations and to initiate modulations to these oscillations. By initiating the oscillations and the modulations of the oscillations on a simultaneous basis, energy consumption in the transmitter is minimized.

It should be appreciated that only one oscillator can be used in place of the oscillators 50 and 52 to produce modulating signals at the different frequencies. For example, a first capacitance can be coupled into the tuned circuit of the oscillator corresponding to the oscillator 50 upon an actuation of the switch 72. Similarly, a second capacitance can be coupled into the tuned circuit of the oscillator when the switch 84 is actuated. Both of the capacitances can be coupled into the tuned circuit of the oscillator when the switch 88 is actuated. In this way, modulating signals at three different frequencies can be produced in accordance with the individual actuation of the switches 72, 84 and 88. This is fully disclosed in copending application Serial No. 766,436.

Although this application has been disclosed and illustrated with reference to particular applications, the principles involved are susceptible of numerous other applications which will be apparent to persons skilled in the art.

The invention is, therefore, to be limited only as indicated by the scope of the appended claims.

What is claimed is:

1. In combination for generating oscillatory signals at a particular frequency for a single period of time having a controlled duration, a semiconductor having an input electrode, a control electrode and an output electrode, a tuned circuit coupled to the semiconductor between the input and output electrodes of the semi-conductor and resonant at the particular frequency, electrical circuitry including the tuned circuit for providing a feedback of energy from the output electrode of the semiconductor and for providing this feedback in a phase relationship with respect to the flow of current through the output terminal of the semiconductor to produce oscillatory characteristics in the flow of current, bias means coupled electrically to the semiconductor to bias the electrodes for a flow of current through the semiconductor, and energy-storage means coupled electrically to the input and output electrodes of the semiconductor and in parallel with the bias means to receive the flow of current through the semiconductor for a storage of energy in accordance with the amplitude and duration of the current flow and for the production of an effective impedance in accordance with the amount of energy in the storage means and for the production of an oscillatory current of substantially constant amplitude and to obtain a state of nonconductance in the semiconductor upon the occurrence of a particular effective impedance for the energy-storage means and reactance means having only an inductive reactance and coupled electrically between the input and control electrodes of the semi-conductor.

2. In combination for generating oscillatory signals at a particular frequency for a single period of time having a controlled duration, a semi-conductor having an input electrode, a control electrode and an output electrode, a tuned circuit coupled to the semiconductor between the input and output electrodes of the semi-conductor and resonant at the particular frequency, means coupled electrically to the tuned circuit for providing a feedback of energy from the tuned circuit to the control electrode of the semiconductor to obtain an opposite operation of the semiconductor from that previously produced in the semiconductor, reactance means and resistance means disposed electrically in series between the input electrode and the output electrode of the semiconductor to produce a storage of energy in the reactance means upon a flow of oscillatory current and to inhibit the flow of such oscillatory current through the semiconductor upon the production of a particular energy level in the reactance means dependent upon the time constant provided by the resistance means and the reactance means and reactance means having only an inductive reactance disposed between the input and control electrodes of the semiconductor.

3. In combination for generating oscillatory signals at a particular resonant frequency for a single period of time having a controlled duration, a semiconductor having an input electrode, an output electrode and a control electrode, a tuned circuit coupled between the input electrode and the output electrode and resonant at the particular frequency, a source of direct voltage disposed electrically between the control electrode and the output electrode of the semiconductor to initiate a flow of current through the semiconductor, a feedback path extending from the resonant circuit to the control electrode to feed energy to the control electrode in an inverse phase relationship to the passage of energy to the output electrode for the production of an oscillatory current in the semiconductor and a capacitance and a resistance connected in series between the input electrode and the output electrode to produce a charge in the capacitance in accordance with the flow of current through the semiconductor and to produce a state of nonconductance in the semiconductor upon the production between the input and output electrodes of a particular voltage resulting from the charge and to obtain the production of an oscillatory current of substantially constant amplitude through the semiconductor and an inductance and a resistance in series between the input and control electrodes of the semiconductor.

4. In combination for generating oscillatory signals at a particular frequency for a single period of time having a controlled duration, a semiconductor having an input electrode, an output electrode and a control electrode, a parallel resonant circuit formed by an inductance and a capacitance and tuned to the particular frequency and connected to the output electrode of the semiconductor, electrical circuitry connected between the parallel resonant circuit and the control electrode of the semiconductor to feed energy back to the control electrode in inverse phase relationship to the introduction of energy to the output electrode of the semiconductor for the production of an oscillatory current through the semiconductor, a source of direct voltage connected between the control and output electrodes of the semiconductor to obtain a flow of current through the semiconductor for the production of the oscillatory current through the semiconductor, and a capacitance and a resistance connected on a series and provided with a time constant dependent upon the controlled period of time for the production of the oscillatory signals and connected between the input and output electrodes of the semiconductor to and across the source of direct voltage to provide an instantaneous flow of oscillatory current through the semiconductor and to provide for a flow of oscillatory current of substantially constant amplitude and to provide a charge in the capacitance in accordance with the flow of current through the semiconductor for the production of a voltage dependent upon the charge and for a cutoff of the semiconductor upon the production of a particular voltage across the capacitance and an inductance and a resistance in series between the input and control electrodes of the semi-conductor.

5. In combination, a modulator for producing modulating signals; an oscillator including a tuned circuit resonant at a first particular frequency and including a semiconductor having control and output electrodes coupled to the tuned circuit and including a capacitance coupled to the control and output electrodes of the semiconductor for producing signals at the first particular frequency only for a period of time dependent upon the voltage produced across the capacitance by the charge in the capacitance resulting from a flow of current through the semiconductor; and a second semiconductor disposed electrically between the modulator and the oscillator to provide for the passage of the modulating signals to the oscillator for modulation of the oscillatory signals during the production of the oscillatory signals by the oscillator and coupled to the capacitance for a control over the state of conductivity of the second semiconductor in accordance with the charge in the capacitance.

6. In combination, a modulator for producing signals at a first frequency, a first semi-conductor having control and output electrodes and coupled to the modulator for passing the signals from the modulator, a capacitance constructed to receive a charge in the capacitance and coupled to the control electrodes of the semiconductor for controlling the passage of signals through the semiconductor in accordance with the charge produced across the capacitance, an oscillator including the capacitance for producing oscillatory signals at a second frequency different from the first frequency and for producing a charge in the capacitance in accordance with the production of the oscillatory signals and for interrupting the production of the oscillatory signals upon the occurrence of a particular charge in the capacitance, the oscillator being coupled to the control and output electrodes of the semiconductor to receive the first oscillatory signals for the modulation of the first oscillatory signals by the second oscillatory signals during the state of conductivity of the first semiconductor and only during the production of the oscillatory signals by the oscillator.

7. In combination, a first oscillator including a first semiconductor having control and output electrodes, a tuned circuit coupled to the semiconductor and resonant at a particular frequency, a source of direct voltage coupled to the semiconductor to obtain a flow of current through the semiconductor, and a capacitance coupled to the control and output electrodes of the first semiconductor to receive a charge upon a flow of current through the first semiconductor and to bias the first semiconductor against the production of the oscillatory signals upon the production of a particular charge dependent upon the value of the capacitance; a modulator for providing signals at a second particular frequency different from the first particular frequency for modulation with the signals at the first particular frequency; and a second semiconductor disposed electrically between the first oscillator and the modulator for passing the signals from the modulator to the first oscillator for modulation by the first oscillator, the second semiconductor being coupled electrically to the capacitance in the first oscillator for conductance only during the conductivity of the first semiconductor in accordance with the charge in the capacitance.

8. In combination, an oscillator including a first semiconductor having control and output electrodes, a tuned circuit coupled to the first semiconductor and resonant at a first particular frequency, a source of direct voltage coupled to the control and output electrodes of the first semiconductor for biasing the first semiconductor to obtain a flow of current through the first semiconductor, and a capacitance coupled to the first semiconductor for receiving the current flowing through the first semiconductor to produce a potential dependent upon the charge produced in the capacitance by the flow of current and upon the value of the capacitance for a bias of the first semiconductor to a state of nonconductivity upon the occurrence of a particular charge in the capacitance; a modulator for producing signals for modulating the oscillatory signals; and a second semiconductor connected in a series circuit with the modulator and the oscillator for passing the modulating signals to the oscillator for modulation during the production of oscillatory signals by the oscillator.

9. The combination set forth in claim 8, in which the second semiconductor is coupled to the capacitance for the production of a state of conductivity of the semiconductor only during the production of the oscillatory signals by the oscillator.

10. In combination, a modulator for providing signals at a first particular frequency; an oscillator including a first semiconductor having control and output electrodes and including a capacitance coupled electrically to the control and output electrodes of the semi-conductor and chargeable upon the production of oscillatory signals in the oscillator to control the production of the signals for a particular period of time in accordance with the production across the capacitance of a voltage resulting from the charge in the capacitance; a second semiconductor coupled to the first semiconductor for biasing in accordance with the bias of the first semiconductor and coupled to the first oscillator for introducing the signals from the modulator to the oscillator for a modulation of the signals from the oscillator and for introducing such signals from the modulator to the oscillator only during the production of the oscillatory signals by the oscillator; and means coupled to the first and second semiconductors for normally biasing the semiconductors against conductivity, the capacitance being coupled to the first and second semiconductors for a corresponding control over the conductivity of the semiconductors in accordance with the voltage produced across the capacitance by the charge in the capacitance.

11. In combination, an oscillator including a first semiconductor and constructed to produce oscillations for a controlled period of time, a modulator constructed to produce signals, a second semiconductor disposed electrically between the modulator and the oscillator to control the introduction of signals from the modulator to the oscillator for a modulation of the signals in the oscillator, bias means coupled to the first and second semiconductors for producing corresponding biases on the first and second semiconductors to prevent the introduction of signals from the modulator to the oscillator and to prevent the production of signals in the oscillator, and energy storage means included in the oscillator and coupled electrically to the first and second semiconductors for controlling the period of conductivity of the first semiconductor and for obtaining a conductivity of the second semiconductor only during the period of conductivity of the first semiconductor to obtain oscillatory signals from the first semiconductor for the particular period of time and to obtain a simultaneous state of conductivity in the second semiconductor for the passage of signals from the modulator to the oscillator.

References Cited in the file of this patent

UNITED STATES PATENTS

| | | |
|---|---|---|
| 1,621,034 | Slepian | Mar. 15, 1927 |
| 2,163,403 | Meacham | June 20, 1939 |
| 2,764,643 | Sulzer | Sept. 25, 1956 |
| 2,825,810 | Zeidler | Mar. 4, 1958 |
| 2,836,724 | Kaminow | May 27, 1958 |
| 2,842,669 | Thomas | July 8, 1958 |
| 2,852,746 | Scheele | Sept. 16, 1958 |
| 2,870,421 | Goodrich | Jan. 20, 1959 |